US009762151B2

(12) United States Patent
Zhang et al.

(10) Patent No.: US 9,762,151 B2
(45) Date of Patent: Sep. 12, 2017

(54) INTEGRATED MICRO/NANOGENERATOR AND METHOD OF FABRICATING THE SAME

(71) Applicant: PEKING UNIVERSITY, Beijing (CN)

(72) Inventors: Haixia Zhang, Beijing (CN); Xiaosheng Zhang, Beijing (CN); Mengdi Han, Beijing (CN); Fuyun Zhu, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 320 days.

(21) Appl. No.: 14/650,834

(22) PCT Filed: Apr. 8, 2013

(86) PCT No.: PCT/CN2013/000398
§ 371 (c)(1),
(2) Date: Jun. 9, 2015

(87) PCT Pub. No.: WO2014/089891
PCT Pub. Date: Jun. 19, 2014

(65) Prior Publication Data
US 2015/0372620 A1 Dec. 24, 2015

(30) Foreign Application Priority Data
Dec. 10, 2012 (CN) .......................... 2012 1 0530458

(51) Int. Cl.
*H02N 11/00* (2006.01)
*H02N 1/04* (2006.01)
(52) U.S. Cl.
CPC ............. *H02N 11/002* (2013.01); *H02N 1/04* (2013.01); *Y10T 29/49119* (2015.01)
(58) Field of Classification Search
CPC .... H02N 1/04; H02N 11/002; Y10T 29/49119
See application file for complete search history.

(56) References Cited

FOREIGN PATENT DOCUMENTS

CN 101710744 A 5/2010
CN 102646788 A 8/2012
(Continued)

OTHER PUBLICATIONS

English Translation of the International Search Report mailed Aug. 8, 2013, for corresponding International Application No. PCT/CN2013/000398, 2 pages.
(Continued)

*Primary Examiner* — Mohamad Musleh
(74) *Attorney, Agent, or Firm* — Seed IP Law Group LLP

(57) ABSTRACT

The present disclosure discloses an integrated micro/nanogenerator and a method of fabricating the same The integrated micro/nanogenerator has a structure comprising a conducting layer, a PET layer, a PDMS layer, a micro-nano hierarchical PDMS array and a metal film layer, the conducting layer being manufactured on a surface of the PET layer, the PET layer being made of polyethylene terephthalate; the PDMS layer being made of polydimethylsiloxane, and the micro-nano hierarchical PDMS array being manufactured on a surface of the PDMS layer. The method comprises steps of: 1) fabricating a micro-scale structure on a substrate through a combination of lithography and chemical etching or physical etching; 2) fabricating a nano-scale structure with high density and high depth-to-width ratio directly on a surface of the micro-scale structure through a mask-free optimized deep reactive ion etching process; 3) using a PDMS casting film transfer process by adjusting and controlling process parameters, by means of using the mold of mirco-nano hierarchical array structure as a template; 4) fabricating a conducting layer on a surface of the PET layer by using an evaporation or sputtering or chemical vapor deposition process; 5) bonding the PDMS layer and the PET layer through high temperature bonding or normal temperature physical pressing; and 6) assembling in sequence and (Continued)

packaging the bonded structure obtained in step 5), the metal film layer, and another bonded structure obtained in step 5).

13 Claims, 4 Drawing Sheets

(56) References Cited

FOREIGN PATENT DOCUMENTS

| | | |
|---|---|---|
| CN | 102683573 A | 9/2012 |
| CN | 103023371 A | 4/2013 |
| JP | 2012-135071 | 7/2012 |

OTHER PUBLICATIONS

English Translation of the Written Opinion mailed Aug. 8, 2013, for corresponding International Application No. PCT/CN2013/000398, 5 pages.

Fan et al., "Flexible triboelectric generator!," *Nano Energy* 1:328-334, 2012.

Fan et al., "Transparent Triboelectric Nanogenerators and Self-Powered Pressure Sensors Based on Micropatterned Plastic Films," *Nano Letters* 12:3109-3114, 2012.

Qin et al., "Microfibre-nanowire hybrid structure for energy scavenging," *Nature* 451:809-816, Feb. 14, 2008.

Wang et al., "Direct-Current Nanogenerator Driven by Ultrasonic Waves," *Science* 316:102-105, Apr. 6, 2007.

Wang et al., "Piezoelectric Nanogenerators Based on Zinc Oxide Nanowire Arrays," *Science* 312:242-247, Apr. 14, 2006.

INTEGRATED MICRO/NANOGENERATOR AND METHOD OF FABRICATING THE SAME

BACKGROUND

Technical Field

The present disclosure generally relates to the field of micro/nano integration technology, and particularly, to an Integrated Micro/nanogenerator and a method of fabricating the same.

Description of the Related Art

Micro-electro-mechanical system (MEMS) is, since being developed in the 1980s, a new-emerging and high technology involved in many realms and leading the development of microelectronics industry in the new century, and thus has attracted so many attentions in the worldwide. A plurality of branches such as optical micro-electro-mechanical system (Optical MEMS), radio-frequency micro-electro-mechanical system (RF MEMS), biomedical micro-electro-mechanical system (Bio-Medical MEMS) and traditional micro-electro-mechanical system (Physical MEMS) and the like have been booming and growing, and it is predicted that the MEMS industry will rapidly grows at a rate of 9.7% from 2011 to 2016 and will reach up to a global gross product of $12 billion by 2016. However, the above-mentioned MEMS systems and devices are required to be powered, while conventional power modules generally are large in size and difficult in integration machining, which limits the rapid development of MEMS industry. With a further reduction in size of micro-electro-mechanical systems, especially with the development of nano-electro-mechanical system (NEMS), it is extremely urgent to solve the problem of reliably supplying power for miniaturized devices and systems, particularly for micro-scale and nano-scale devices and systems.

A piezoelectric nanogenerator, in which zinc oxide nanowires are used to convert mechanical energy into electrical power, was successfully achieved by the group led by Professor Zhong-Lin WANG in the Georgia Institute of Technology of U.S.A in 2006 [Zhonglin WANG, et al. Science, vol. 312, pp. 5771, 2006; Xudong WANG, et al. Science, vol. 316, pp. 5821, 2007; Yong QIN, et al. Nature, vol. 451, pp. 7180, 2008]. Subsequently, many structures and many piezoelectric materials have been proposed to fabricate nanogenerators, but they are classified in mechanism into piezoelectric type nanogenerators [Guang ZHU, et al. Nanogenerator and Method of Fabricating the Same, Chinese invention patent application No. 201210116881.4; Mengke LI, et al. Nanogenerator, Chinese invention patent application No. 200910188057.8; Zhonglin WANG, et al. Nanogenerator, Nanogenerator Assembly and Self-Powered System Thereof, Chinese invention patent application No. 201210142387]. The piezoelectric nanogenerator technologies have been ripen and are applied in some industries; the piezoelectric materials such as zinc oxide nanowires and the like, however, are generally manufactured by a Bottom-Up growth process with low yield, poor uniformity and low output; and the devices have poor fatigue resistance and short service life due to frangibility of the nanowire material itself.

In January, 2012, the Professor Zhonglin Wang's study group proposed a new triboelectrification-based nanogenerator, in which PET and Kapton materials are used as the triboelectric pair to generate charges through the contact-mode triboelectrification effect, and the output power is generated during its periodic pressing/releasing process. [Feng-Ru FAN, et al. Nano Energy, vol. 1, pp. 328, 2012]. In March, 2012, the group led by Professor Zhonglin WANG proposed an improved structure for the triboelectrification-based nanogenerator, in which PDMS material, in place of the Kapton material, is used to induce charges by friction with the PET materials, and a micro-scale pyramid array structure is manufactured on a surface of the PDMS so as to increase its roughness, thereby increasing output [Feng-Ru FAN, et al. Nano Letters, vol. 12, pp. 3109, 2012]. The above-mentioned structures, although of different from each other in materials, are essentially those in which friction are made between surfaces of two layers of films, have the roughness which are only improved by the micro-scale structure, and have a maximal output voltage of 18V, which cannot meet power supply requirements of some micro-nano systems.

SUMMARY OF THE DISCLOSURE

An object of the present disclosure is to provide an integrated micro/nanogenerator and a method of fabricating the same, wherein three layers of flexible films form a miniaturized generator, and thus essentially form a sandwich-shaped morphology with a gradient difference among charge-binding abilities, which enhances the accumulation of induced charges and thereby increases the output performance of triboelectric generator. Furthermore, the high-dense micro/nano hierarchical structures is fabricated on the surface of flexible film by using the replication process, which significantly increases the roughness of friction surface, thereby further increasing the output voltage/current. Compared with conventional two-layers generator, the intermediate layer of this three-layer sandwich-shaped generator makes electrification with both of upper and lower films during each cycle period, thereby improving the electrification efficiency and achieving frequency multiplication of output signals. In summary, with the integrated micro/nanogenerator and method of fabricating the same according to the present disclosure, there are advantages such as simple process, low cost, high yield, mass production, and great increase the output due to its novel configuration.

In order to achieve the abovementioned object, the present disclosure provides an integrated micro/nanogenerator with a structure comprising a conducting layer, a PET layer, a PDMS layer, a micro-nano hierarchical PDMS array and a metal layer, the conducting layer being manufactured on a surface of the PET layer from a metal or semiconductor material having good electrical conductivity; the PET layer being made of polyethylene terephthalate; the PDMS layer being made of polydimethylsiloxane; the micro-nano hierarchical PDMS array being manufactured on a surface of the PDMS layer and being consisted of a micro-array structure and a nano-scale structure; the metal film layer is made of aluminum or other metal materials having strong ability to capture charges, such as nickel, copper, silver, gold or platinum. The metal having good electrical conductivity is gold, silver, platinum, copper, aluminum, titanium or tungsten. The semiconductor material comprises indium tin metal oxide (ITO), III-V group compounds or high-doped silicon.

The conducting layer has a thickness of 50 nm~2000 nm.
The PET layer has a thickness of 50 µm~2000 µm.
The PDMS layer has a thickness of 50 µm~2000 µm.
The metal film layer has a thickness of 20 µm~2000 µm.
The micro-scale structure is a pyramidal array, a grooved grid array or a hemispheric array with a featured size of 1 µm~200 µm and a spacing of 1 µm~50 µm. The nano-scale structure comprises nano sieve pores or nano burrs with a featured size of 2 nm~1000 nm and a spacing of 2 nm~500 nm.

A method of fabricating a integrated micro/nanogenerator is provided, and the method comprises steps of:

1) fabricating a micro-scale structure on a silicon substrate, a glass substrate or a metal substrate through a combination of lithography and chemical etching or physical etching;

2) fabricating a nano-scale structure with high density and high depth-to-width ratio directly on a surface of the micro-scale structure through a mask-free optimized deep reactive ion etching process, thereby obtaining a mold of micro/nano hierarchical array structure;

3) forming a PDMS layer having a surface with a micro/nano hierarchical PDMS array through a PDMS casting film transfer process by adjusting and controlling process parameters, by means of using the mold of micro/nano hierarchical array structure as a template;

4) fabricating a conducting layer on a surface of the PET layer by using an evaporation or sputtering or chemical vapor deposition process;

5) bonding the PDMS layer and the PET layer through high temperature bonding or normal temperature physical pressing; and 6) assembling in sequence and packaging one bonded structure of PET layer and PDMS layer, the metal film layer, and another bonded structure of PET layer and PDMS layer.

The mask-free optimized deep reactive ion etching process in the step 2) comprises steps of:

2.1) performing a roughening treatment on a surface of the substrate through plasma etching or non-plasma etching;

2.2) performing initialization and plasma stabilization of a DRIE apparatus;

2.3) directly fabricating the nano-scale structure with high density and high depth-to-width ratio by controlling DRIE process parameters; and 2.4) processing the surface through a DRIE post-treatment process so as to reduce surface energy.

The DRIE process parameters for fabricating the nano-scale structure with high density and high depth-to-width ratio comprise: a coil power of 800 W~900 W; an intensity of pressure of 20 mTorr~30 mTorr; an etching gas of $SF_6$ with a flow rate of 20 sccm~45 sccm, a passivation gas of $C_4F_8$ or $O_2$ with a flow rate of 30 sccm~50 sccm, wherein a ration between the flow rates of the $SF_6$ gas and the $C_4F_8$ gas is 1:1~1:2; a flat plate power of 6 W~12 W; an etching/passivation time ratio of 10 s: 10 s~4 s: 4 s; and an etching/passivation time cycle of 60~200 times.

The DRIE post-treatment process parameters comprise: a coil power of 800 W~900 W; an intensity of pressure of 20 mTorr-30 mTorr; an etching gas of $SF_6$ with a flow rate of 0 sccm, a passivation gas of $C_4F_8$ or $O_2$ with a flow rate of 30 sccm~50 sccm; a flat plate power of 6 W~12 W; an etching/passivation time ratio of 0s: 10s~0s: 4s; and an etching/passivation time cycle of 1~20 times.

The process parameters in step 3) comprise a temperature of 50~100° C. and a time period of 30 minutes~2 hours.

The micro-scale structure comprises a pyramidal array, a grooved grid array or a hemispheric array, and the nano-scale structure comprises nano sieve pores or nano burrs.

Compared with prior arts, the present disclosure has the following advantages:

1. Compared with existing technologies of pure triboelectrification between two-layers of materials, the integrated micro/nanogenerator according to the present disclosure proposes an inventive triboelectrification mechanism among three-layers of flexible films, in which the gradient difference among charge-binding abilities of the three materials is utilized so that materials of the intermediate metal layer make two times of friction with the PDMS layer during each working period, thereby improving the output voltage frequency.

2. The integrated micro/nanogenerator according to the present disclosure makes use of a three-layer film structure in which the intermediate layer can make friction with both of upper and lower layers of films, thereby greatly improving friction efficiency and effective friction area to greatly increase its output, compared with existing two-layer of films and single-face triboelectrification technologies.

3. With the method of fabricating the integrated micro/nanogenerator according to the present disclosure, a developed mask-free optimized deep reactive ion etching process is utilized in combination with the casting film transfer process to produce micro-nano hierarchical PDMS films in large-quantities and in large area, thereby greatly increasing film roughness, improving friction efficiency, increasing output voltage/current, and achieving simple processes, low cost and easy industrialization.

DETAILED DESCRIPTION OF THE EMBODIMENTS

The present disclosure will be described hereinafter in conjunction with embodiments. The present disclosure is not limited to these embodiments, and the scope of the present disclosure is defined in the claims.

An integrated micro/nanogenerator and specific steps of a method of fabricating the same are described below with reference to FIGS. 1-4.

Figure 1:
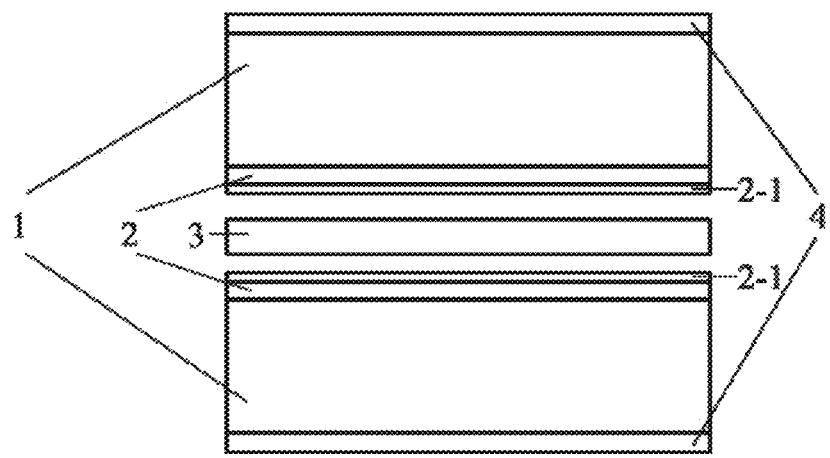
FIG. 1 is a structural schematic diagram of an integrated micro/nanogenerator of the present disclosure.

Referring to FIG. 1, shown is a structural schematic diagram of a integrated micro/nanogenerator of the present disclosure, the integrated micro/nanogenerator has a structure comprising a PET layer 1, a PDMS layer 2, a micro-nano hierarchical PDMS array 2-1, a metal film layer 3 and a conducting layer 4.

Figure 2A:
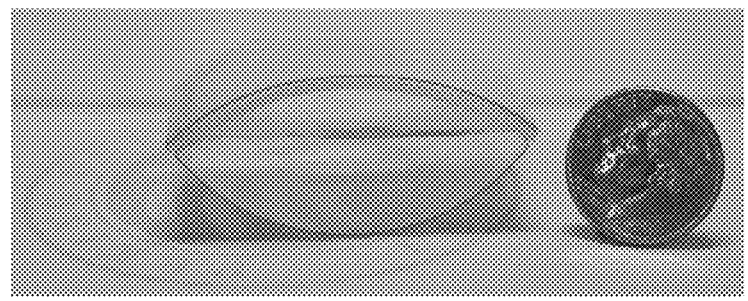
FIG. 2A is a physical drawing of the integrated micro/nanogenerator of the present disclosure.
Figure 2B:
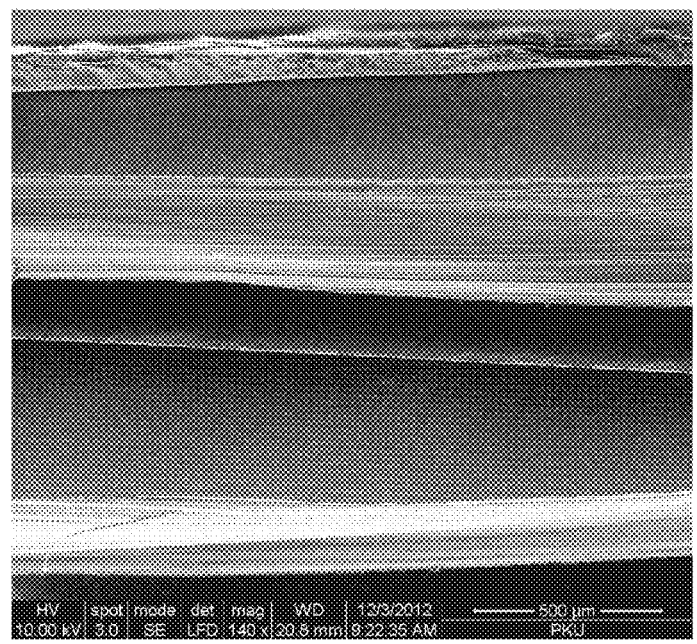
FIG. 2B is a cross-sectional SEM photograph of the present disclosure.
Figure 3A:
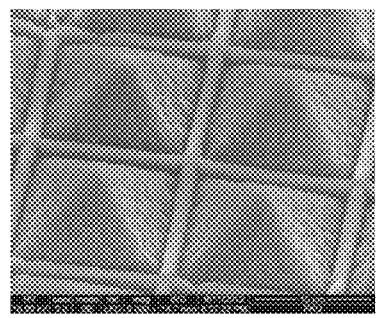
FIG. 3A is a SEM photograph of the micro-nano hierarchical PDMS array of the present disclosure, showing a pyramid array.
Figure 3B:
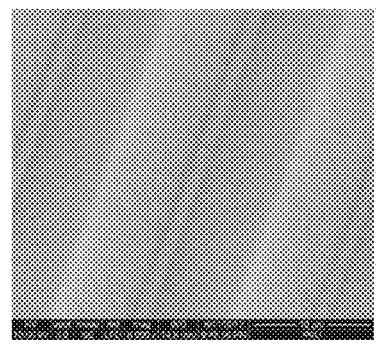
FIG. 3B is a SEM photograph of the micro-nano hierarchical PDMS array of the present disclosure, showing a grooved grid array.
Figure 4:
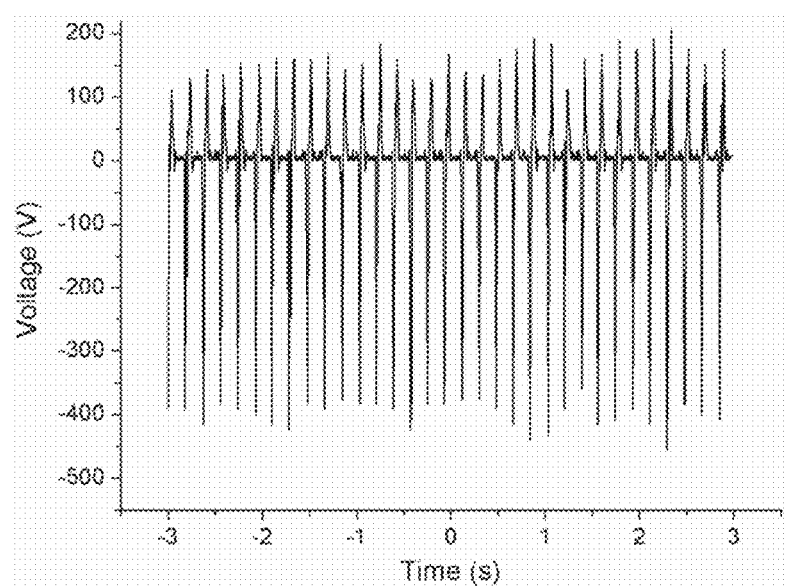
FIG. 4 is a diagram showing results of testing the integrated micro/nanogenerator of the present disclosure.

Referring to FIG. 2, shown are physical drawing and SEM photograph of the integrated micro/nanogenerator of the present disclosure; FIG. 3A is SEM photograph of the micro-nano hierarchical PDMS array of the present disclosure, showing a pyramid array, FIG. 3B is SEM photograph of the micro-nano hierarchical PDMS array of the present disclosure, showing a grooved grid array; and, FIG. 4 is a diagram showing results of testing the integrated micro/nanogenerator of the present disclosure. Steps of fabricating the structure shown in FIG. 1 are provided as follows:

step 1 of: fabricating a micro-scale structure on a silicon substrate or a glass substrate or a metal substrate through a combination of lithography and chemical etching or physical etching, the micro-scale structure comprising a pyramidal array, grooved grid array or hemispheric array with a feature size of 1 μm~200 μm and a spacing of 1 μm~50 μm;

step 2 of: fabricating a nano-scale structure with high density and high depth-to-width ratio directly on a surface of the micro-scale structure through a mask-free optimized deep reactive ion etching process, the nano-scale structure comprising nano sieve pores or nano burrs with a feature size of 2 nm~1000 nm and a spacing of 2 nm~500 nm, thereby obtaining a mold of mirco-nano hierarchical array structure;

step 3 of: forming a PDMS layer 2 having a surface with a micro/nano hierarchical PDMS array 2-1 through a PDMS casting film transfer process by adjusting and controlling process parameters comprising a temperature of 50~100° C. and a time period of 30 minutes~2 hours, by means of using the mold of micro/nano hierarchical array structure as a template;

step 4 of: fabricating a conducting layer 4 on a surface of the PET layer 1 by using an evaporation or sputtering or chemical vapor deposition process, the conducting layer comprising a metal or semiconductor material having a good electrical conductivity, the metal being gold, silver, platinum, copper, aluminum, titanium or tungsten, the semiconductor material comprising indium tin metal oxide (ITO), III-V group compounds or highly doped silicon, and the conducting layer having a thickness of 50 nm~2000 nm;

step 5 of: bonding the PDMS layer 2 and the PET layer 1 through high temperature bonding or normal temperature physical pressing; and step 6 of: assembling in sequence and packaging one bonded structure of PET layer 1 and PDMS layer 2 having a surface on which the conducting layer 4 is attached, the metal film layer 3, and another bonded structure of PET layer 1 and PDMS layer 2 having a surface on which the conducting layer 4 is attached.

The integrated micro/nanogenerator and the method of fabricating the same provided by the present disclosure have been described above in detail, and exemplary embodiments of the present application are described above with reference to drawing figures. It would be appreciated by those skilled in the art that the above embodiments are intended to be illustrative for purpose of description, but not limitative. Changes and equivalents, which are made without departing from teaching of the present application and the scopes of claims, should be included within the scopes of claims of the present application.

What is claimed is:

1. An integrated micro/nanogenerator, the generator has a structure comprising a conducting layer, a PET layer, a PDMS layer, a micro-nano hierarchical PDMS array and a metal film layer, the conducting layer being manufactured on a surface of the PET layer from a metal or semiconductor material having good electrical conductivity; the PET layer being made of polyethylene terephthalate; the PDMS layer being made of polydimethylsiloxane; the micro-nano hierarchical PDMS array being manufactured on a surface of the PDMS layer and being consisted of a micro-array structure and a nano-scale structure; the metal film layer being made of metal having strong ability to capture charges; and one bonded structure of PET layer and PDMS layer, the metal film layer, and another bonded structure of PET layer and PDMS layer being assembled in sequence and packaged.

2. The integrated micro/nanogenerator according to claim 1, wherein the metal having good electrical conductivity is gold, silver, platinum, copper, aluminum, titanium or tungsten; the semiconductor material comprises indium tin metal oxide (ITO), III-V group compounds or high-doped silicon; and the metal having strong ability to capture charges comprises aluminum, nickel, copper, silver, gold or platinum.

3. The integrated micro/nanogenerator according to claim 1, wherein the conducting layer has a thickness of 50 nm~2000 nm.

4. The integrated micro/nanogenerator according to claim 1, wherein the PET layer has a thickness of 50 μm~2000 μm.

5. The integrated micro/nanogenerator according to claim 1, wherein the PDMS layer has a thickness of 50 μm~2000 μm.

6. The Integrated Micro/nanogenerator according to claim 1, wherein the metal film layer has a thickness of 20 μm~2000 μm.

7. The integrated micro/nanogenerator according to claim 1, wherein the micro-scale structure is a pyramidal array, a grooved grid array or a hemispheric array with a featured size of 1 μm~200 μm and a spacing of 1 μm~50 μm; and the nano-scale structure comprises nano sieve pores or nano burrs with a featured size of 2 nm ~1000 nm and a spacing of 2 nm ~500 nm.

8. A method of fabricating the integrated micro/nanogenerator according to claim 1, the method comprising:
    fabricating a micro-scale structure on a silicon substrate or a glass substrate or a metal substrate through a combination of lithography and chemical etching or physical etching;
    fabricating a nano-scale structure with high density and high depth-to-width ratio directly on a surface of the micro-scale structure through a mask-free optimized deep reactive ion etching process, thereby obtaining a mold of mirco-nano hierarchical array structure;
    forming the PDMS layer having a surface with a micro-nano hierarchical PDMS array through a PDMS casting film transfer process by adjusting and controlling process parameters, by means of using the mold of mirco-nano hierarchical array structure as a template;
    fabricating the conducting layer on a surface of the PET layer by using an evaporation or sputtering or chemical vapor deposition process;
    bonding the PDMS layer and the PET layer through high temperature bonding or normal temperature physical pressing; and
    assembling in sequence and packaging one bonded structure of PET layer and PDMS layer, the metal film layer, and another bonded structure of PET layer and PDMS layer.

9. The method of fabricating the integrated micro/nanogenerator according to claim 8, wherein the mask-free optimized deep reactive ion etching process comprises:
    performing a roughening treatment on a surface of the substrate through plasma etching or non-plasma etching;
    performing initialization and plasma stabilization of a DRIE apparatus;
    directly fabricating the nano-scale structure with high density and high depth-to-width ratio by controlling DRIE process parameters; and
    processing the surface through a DRIE post-treatment process so as to reduce surface energy.

10. The method of fabricating the integrated micro/nanogenerator according to claim 9, wherein the DRIE process parameters for fabricating the nano-scale structure with high density and high depth-to-width ratio comprise: a coil power of 800 W~900 W; an intensity of pressure of 20 mTorr–30 mTorr; an etching gas of $SF_6$ with a flow rate of 20 sccm~45 sccm, a passivation gas of $C_4F_8$ or $O_2$ with a flow rate of 30 sccm~50 sccm, wherein a ration between the flow rates of the $SF_6$ gas and the $C_4F_8$ gas is 1:1~1:2; a flat plate power of 6 W~12 W; an etching/passivation time ratio of 10s: 10s~4s: 4s; and an etching/passivation time cycle of 60~200 times.

11. The method of fabricating the integrated micro/nano-generator according to claim 9, wherein the DRIE post-treatment process parameters comprise: a coil power of 800 W~900 W; an intensity of pressure of 20 mTorr–30 mTorr; an etching gas of $SF_6$ with a flow rate of 0 sccm, a passivation gas of $C_4F_8$ or $O_2$ with a flow rate of 30 sccm~50 sccm; a flat plate power of 6 W~12 W; an etching/passivation time ratio of 0s: 10s~0s: 4s; and an etching/passivation time cycle of 1~20 times.

12. The method of fabricating the integrated micro/nano-generator according to claim 8, wherein the process parameters in forming the PDMS layer comprise a temperature of 50~100 ° C. and a time period of 30minutes~2 hours.

13. The method of fabricating the integrated micro/nano-generator according to claim 8, wherein the micro-scale structure comprises a pyramidal array, a grooved grid array or a hemispheric array, and the nano-scale structure comprises nano sieve pores or nano burrs.

* * * * *